(12) United States Patent
Fujinaka

(10) Patent No.: US 9,121,997 B2
(45) Date of Patent: Sep. 1, 2015

(54) LENS BARREL

(71) Applicant: Panasonic Corporation, Osaka (JP)

(72) Inventor: Hiroyasu Fujinaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/296,619

(22) Filed: Jun. 5, 2014

(65) Prior Publication Data

US 2014/0376104 A1    Dec. 25, 2014

(30) Foreign Application Priority Data

Jun. 25, 2013 (JP) ................... 2013-132233
May 22, 2014 (JP) ................... 2014-105863

(51) Int. Cl.
G02B 7/02 (2006.01)
G02B 7/04 (2006.01)
G02B 7/10 (2006.01)

(52) U.S. Cl.
CPC ... G02B 7/04 (2013.01); G02B 7/10 (2013.01)

(58) Field of Classification Search
CPC .................... G02B 7/04; G02B 7/10
USPC .................................. 359/826, 827
See application file for complete search history.

(56) References Cited

U.S. PATENT DOCUMENTS

2001/0017662 A1    8/2001  Nomura et al.
2013/0163107 A1*   6/2013  Yamamoto et al. ........... 359/828

FOREIGN PATENT DOCUMENTS

JP    2001-215390 A    8/2001

* cited by examiner

*Primary Examiner* — William Choi
(74) *Attorney, Agent, or Firm* — Renner, Otto, Boisselle & Sklar, LLP

(57) ABSTRACT

This disclosure aims to miniaturize a lens barrel. The lens barrel includes: a movable frame which has two cam followers provided in a circumferential direction about an optical axis and two guide protrusions arranged along an optical axis direction; a cam frame having two cam grooves with which the two cam followers of the movable frame are engaged respectively; and a guide frame having one guide groove with which the two guide protrusions are engaged. The two cam followers and the two guide protrusions restrict tilting of the movable frame with respect to the cam frame and the guide frame.

5 Claims, 10 Drawing Sheets

LENS BARREL

BACKGROUND

1. Technical Field

This disclosure relates to a lens barrel.

2. Description of the Related Art

Unexamined Japanese Patent Publication No. 2001-215390 (Patent Literature 1) discloses a lens barrel. Patent Literature 1 discloses a technique for reducing eccentric errors between a plurality of lens groups in the lens barrel.

SUMMARY

This disclosure aims to miniaturize a lens barrel.

A lens barrel according to this disclosure includes: a movable frame which has two cam followers provided in a circumferential direction about an optical axis and two guide protrusions provided along an optical axis direction; a cam frame having two cam grooves with which the two cam followers of the movable frame are engaged respectively; and a guide frame having one guide groove with which the two guide protrusions are engaged.

The lens barrel of this disclosure restricts tilting of the movable frame with respect to the cam frame and the guide frame by the two cam followers and the two guide protrusions, whereby the lens barrel can be miniaturized.

DETAILED DESCRIPTION OF THE PREFERRED EMBODIMENT

Hereinafter, an embodiment will be described in detail with reference to the drawings as appropriate. However, detailed description more than necessary may be omitted. For example, the detailed description of well-known matters or the repeated description of substantially the same configuration may be omitted. This is for preventing the following description from being unnecessarily redundant, thus facilitating the understanding by those skilled in the art.

Inventors of this disclosure provide the attached drawings and the following description for enabling those skilled in the art to sufficiently understand this disclosure, and the subject matters defined in the claims are not intended to be restricted by the attached drawings and the following description.

First Embodiment

Hereinafter, a first embodiment will be described with reference to FIGS. 1 to 10.

1. Configuration of Lens Barrel

Figure 1:
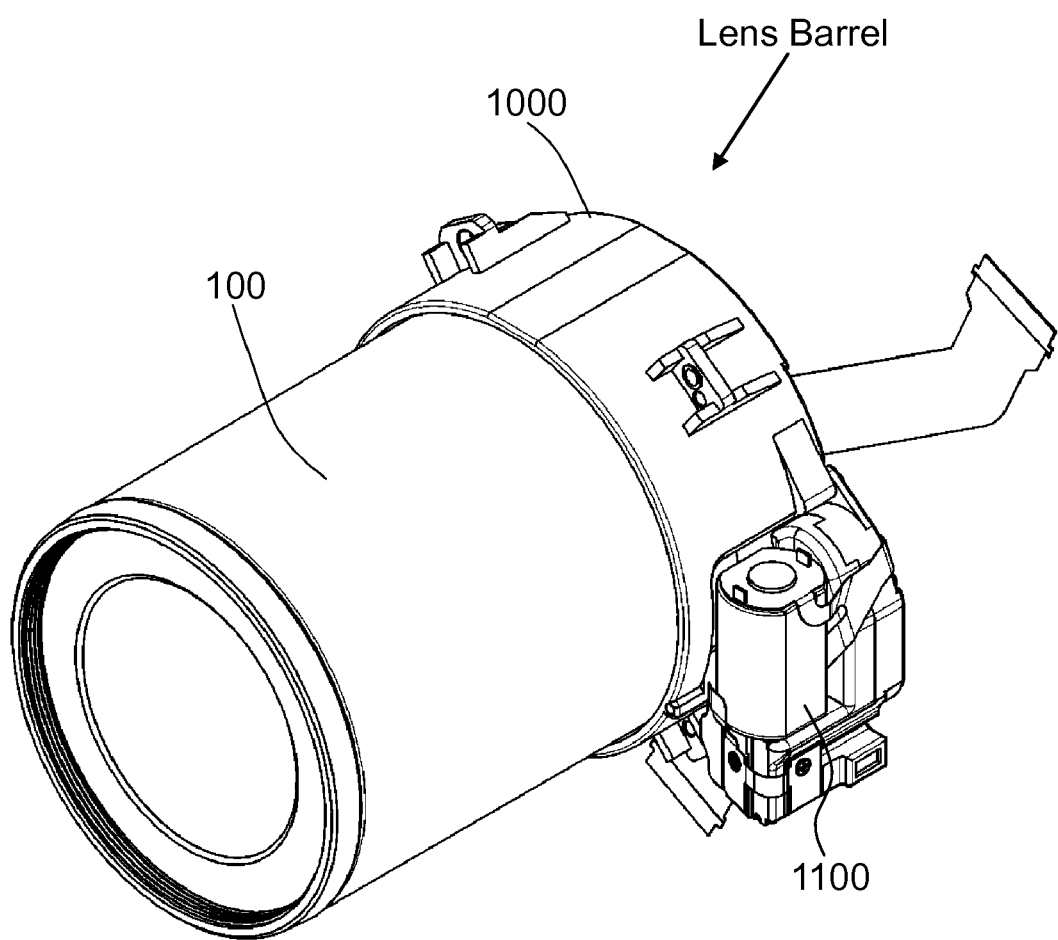
FIG. 1 is a perspective view of a lens barrel according to a first embodiment.

FIG. 1 is a perspective view of a lens barrel. The lens barrel shown in FIG. 1 is fixed to a digital still camera (not shown).

Figure 2:
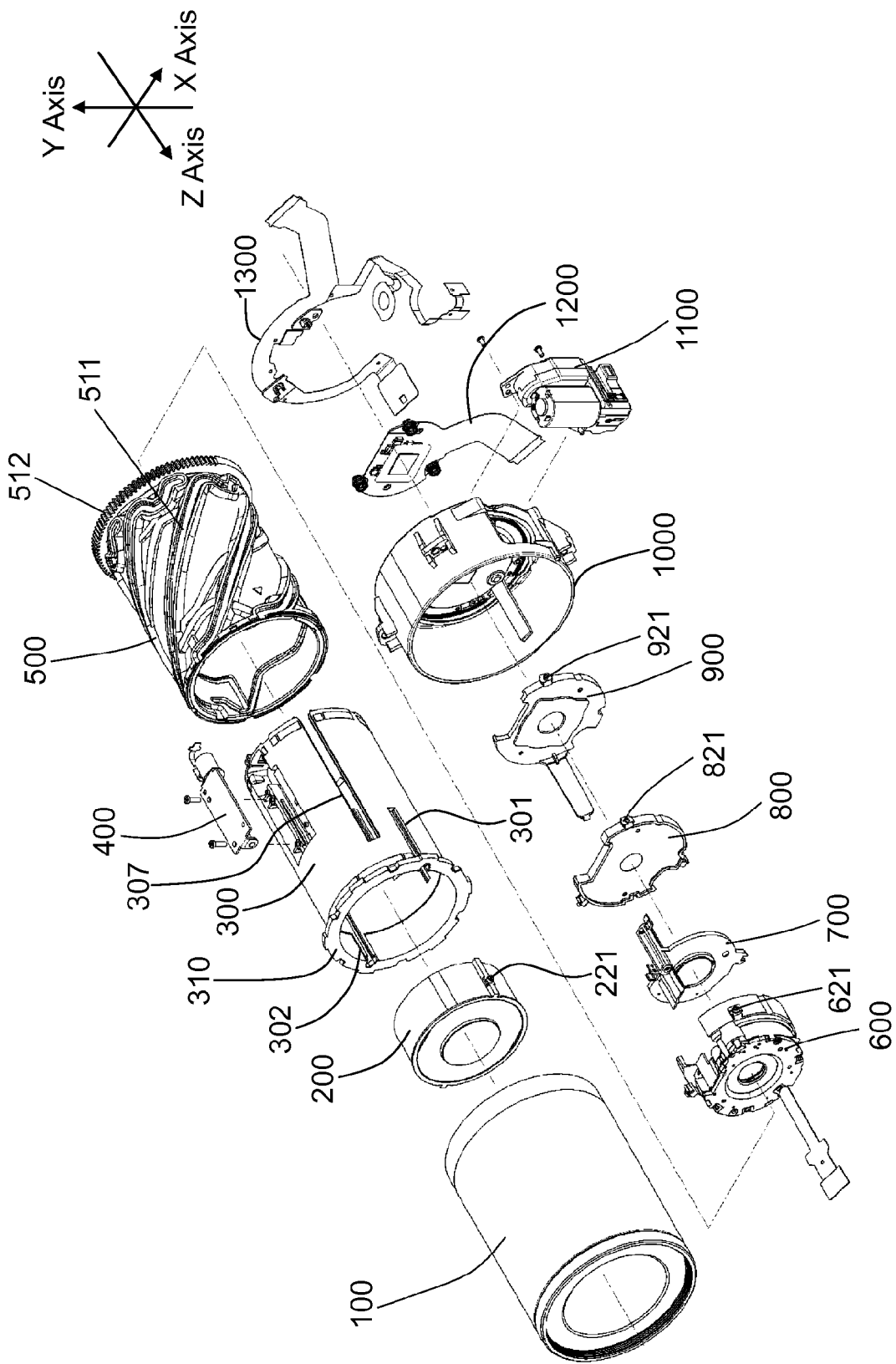
FIG. 2 is an exploded perspective view of the lens barrel according to the first embodiment.

FIG. 2 is an exploded perspective view of the lens barrel. The lens barrel holds an optical system which focuses light as an image on an imaging element in a zooming manner. In the first embodiment, for the sake of convenience, as shown in FIG. 2, assuming an optical axis as a Z axis, a predetermined direction in a plane perpendicular to the optical axis is defined as an X axis, and a direction perpendicular to the X axis is defined as a Y axis. Note that a direction parallel to the optical axis is referred to as "optical axis direction", a direction perpendicular to the optical axis direction is referred to as "radial direction", and the direction along a circle having the optical axis as a center is referred to as "circumferential direction". Further, with respect to "radial direction", the direction toward the optical axis side is referred to as "radially inward direction" and the direction away from the optical axis is referred to as "radially outward direction". The optical axis substantially agrees with axes of the respective frames which configure the lens barrel.

As shown in FIG. 2, the lens barrel includes first group lens unit 100, second group lens unit 200, rectilinear guide frame 300, focus motor unit 400, cam frame 500, third group lens unit 600, fourth group lens unit 700, fifth group lens unit 800, sixth group lens unit 900, master flange 1000, zoom motor unit 1100, imaging element unit 1200, and flexible printed circuit board 1300.

First group lens unit 100 has a substantially cylindrical shape, and lenses for zooming are fixed to first group lens unit 100. Guide grooves and first group cam followers are provided to an inner peripheral surface of first group lens unit 100. The guide grooves of first group lens unit 100 engage with rectilinear protrusions formed on flange portion 310 of rectilinear guide frame 300 so that the rotation of first group lens unit 100 in the circumferential direction is restricted and the movement of first group lens unit 100 in the optical axis direction is guided. The first group cam follower also engages with first group cam groove 511 of cam frame 500. The first group cam follower is guided along first group cam groove 511 due to the rotation of cam frame 500 so that first group lens unit 100 moves in the optical axis direction.

Figure 3:
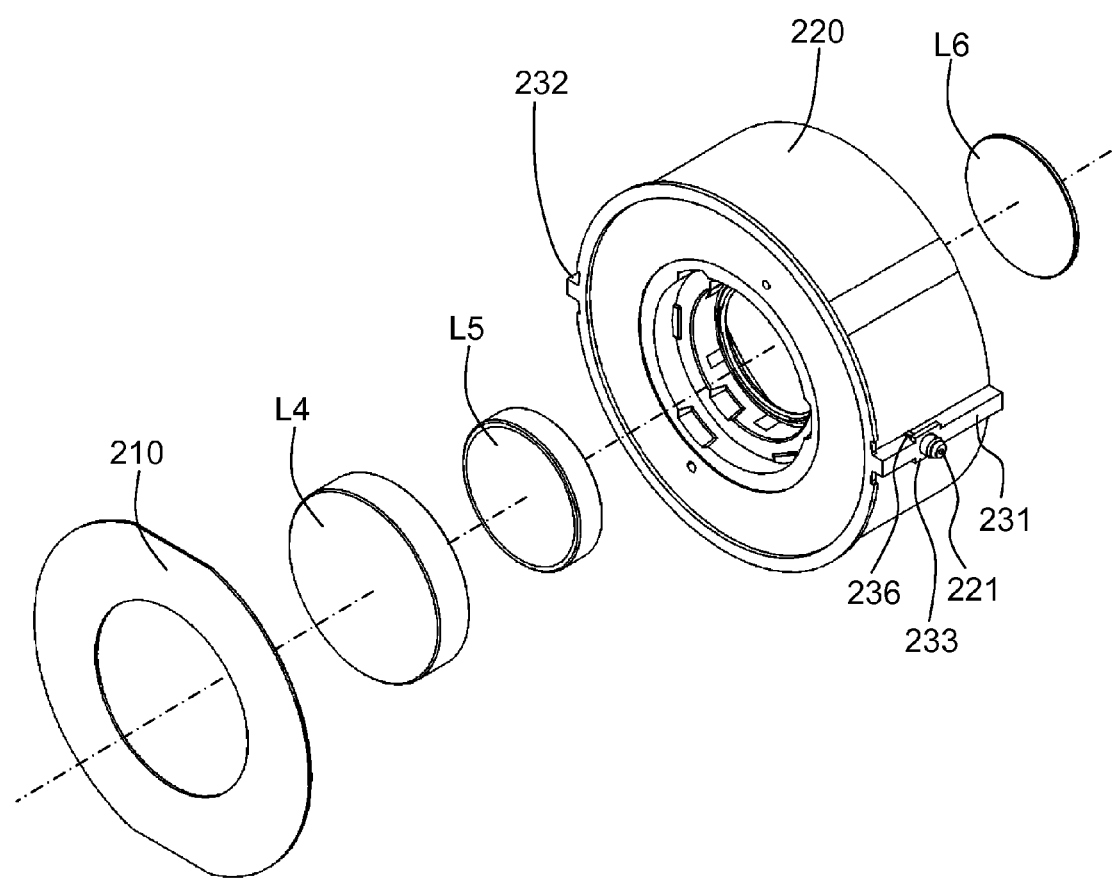
FIG. 3 is an exploded perspective view of second group lens unit 200 according to the first embodiment.

FIG. 3 is an exploded perspective view of second group lens unit 200. Second group lens unit 200 includes second group lens frame 220, light blocking sheet 210, and lenses L4, L5, L6 for zooming in. Second group lens frame 220 has a substantially cylindrical shape, and lenses L4, L5, L6 are fixed to second group lens frame 220. Light blocking sheet 210 to which reflection prevention treatment is applied is fixed to a subject side of second group lens frame 220 for suppressing undesired reflection in the lens barrel.

Figure 4:
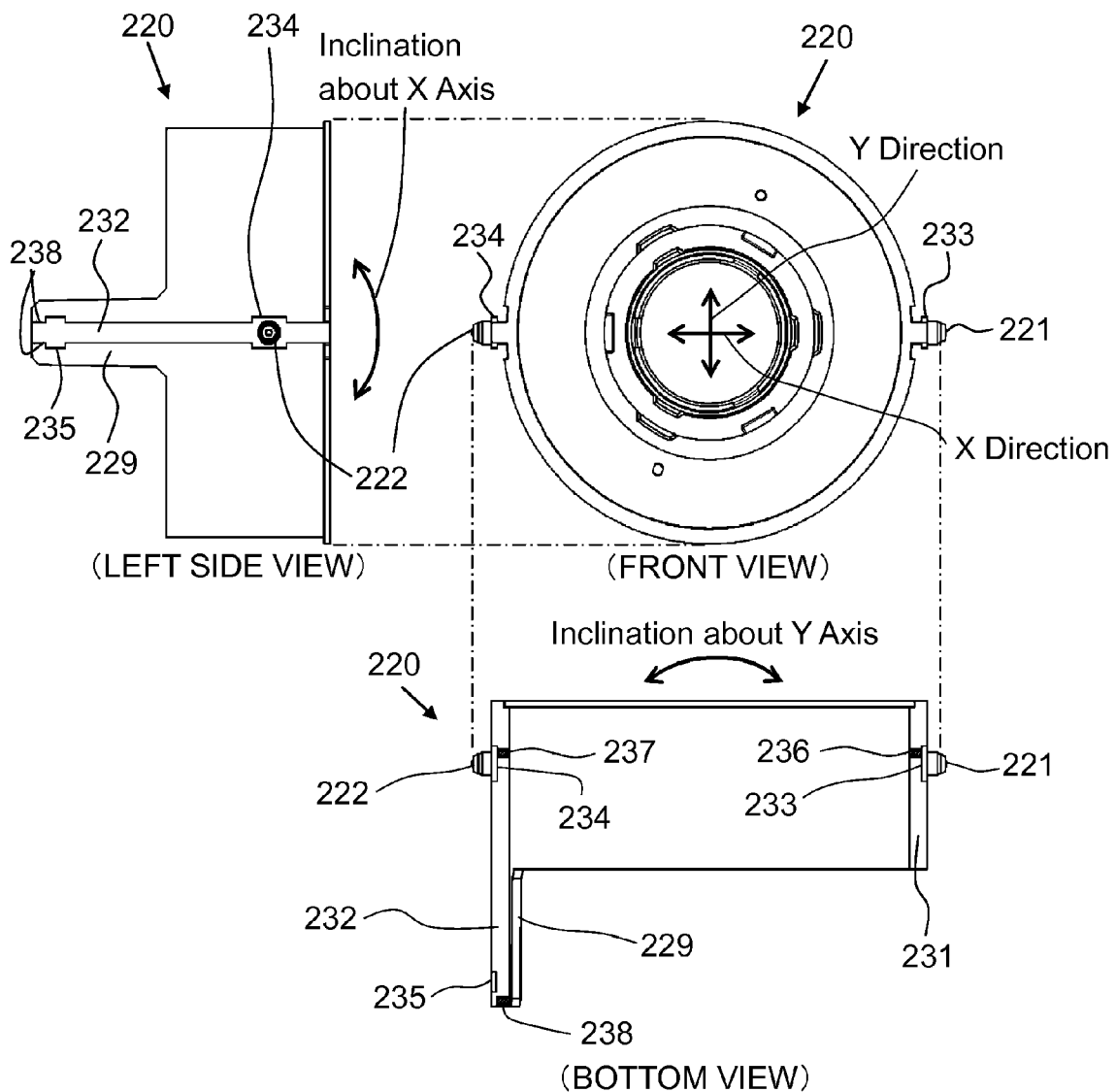
FIG. 4 is an explanatory view showing a shape of second group lens frame 220 according to the first embodiment.

FIG. 4 is an explanatory view showing a shape of second group lens frame 220. Second group lens frame 220 has second group cam followers 221, 222 on an outer peripheral surface thereof. Second cam followers 221, 222 are respectively inserted into second group guide grooves 301, 302 of rectilinear guide frame 300, and engage with second group cam grooves 501, 502 formed on an inner peripheral surface of cam frame 500. The configuration of cam frame 500 will be described later. In second group lens unit 200, due to the rotation of cam frame 500, second group cam followers 221, 222 are guided by second group cam grooves 501, 502 so that second group lens unit 200 moves in the optical axis direction. Second group lens frame 220 is one example of a movable frame.

As shown in FIG. 2, rectilinear guide frame 300 has a substantially cylindrical shape, and holds focus motor unit 400 on an outer peripheral surface thereof on an image formation side. Rectilinear guide frame 300 has flange portion 310 which is raised in the radially outward direction at an end portion thereof on the subject side. Rectilinear protrusions which are raised in the radially outward direction are formed on flange portion 310. The rectilinear protrusions engage with guide grooves formed on an inner peripheral surface of first group lens unit 100, and guide a rectilinear movement of first group lens unit 100. That is, first group lens unit 100 is held by rectilinear guide frame 300 movably in the optical axis direction in a state where the rotation of first group lens unit 100 is restricted by rectilinear guide frame 300.

Figure 5:
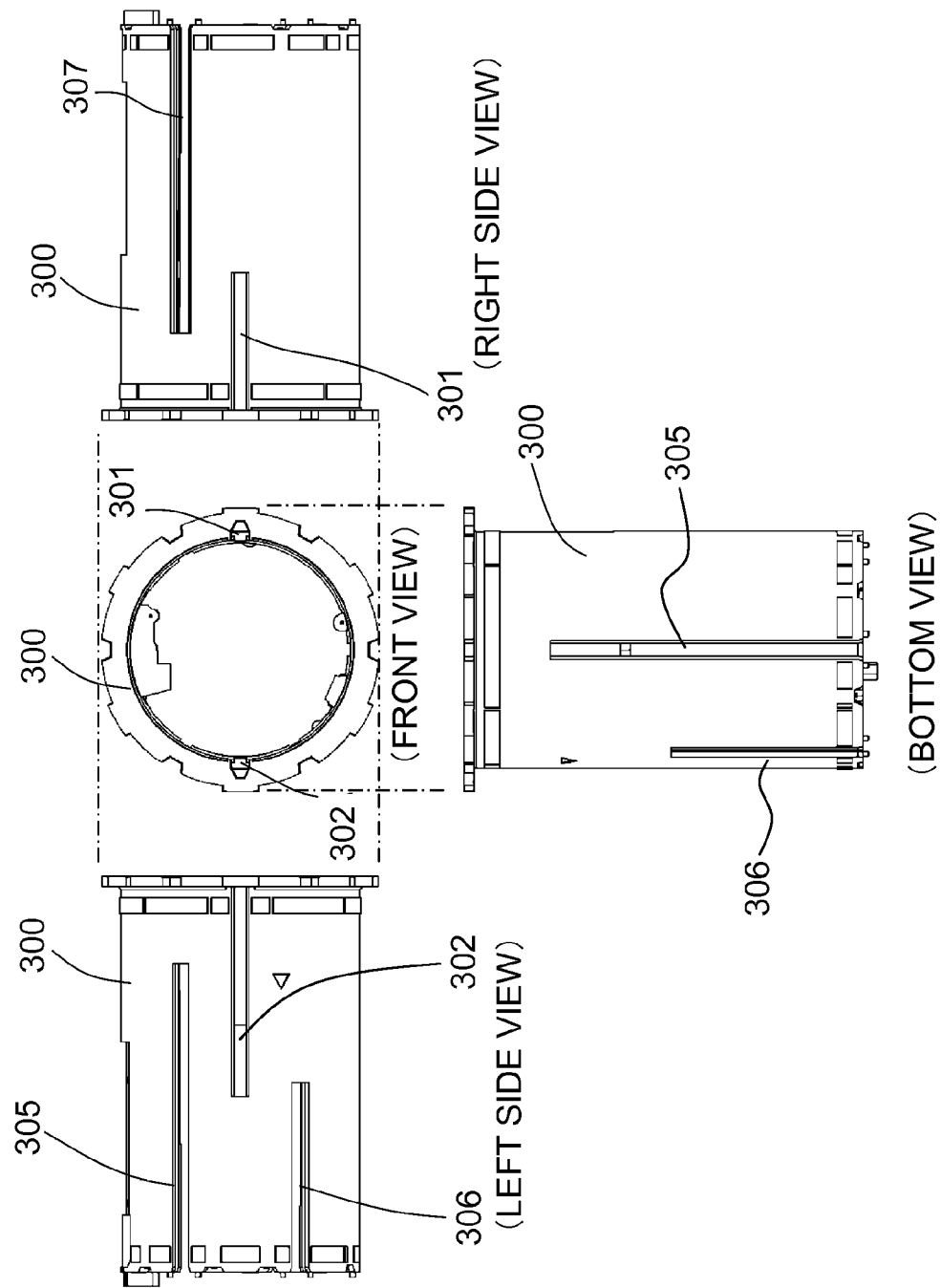
FIG. 5 is an explanatory view showing a shape of rectilinear guide frame 300 according to the first embodiment.

FIG. 5 is an explanatory view showing a shape of rectilinear guide frame 300. As shown in FIG. 5, rectilinear guide frame 300 has second group guide grooves 301, 302 which penetrate rectilinear guide frame 300 from an inner peripheral surface to an outer peripheral surface. Second group guide grooves 301, 302 are formed to extend in the optical axis direction toward the image formation side from an end portion of rectilinear guide frame 300 on the subject side. As shown in FIG. 5, rectilinear guide frame 300 also has two third-fifth group guide grooves 305, sixth group guide groove 306, and third-fifth-sixth group guide groove 307. All of third-fifth group guide grooves 305, sixth group guide groove 306, and third-fifth-sixth group guide groove 307 penetrate rectilinear guide frame 300 from the inner peripheral surface to the outer peripheral surface, and are formed to extend in the optical axis direction toward the subject side from the edge portion of rectilinear guide frame 300 on the image formation side. That is, a total of four guide grooves are formed from the end portion of rectilinear guide frame 300 on the image formation side. The respective cam followers of third group lens unit 600, fifth group lens unit 800 and sixth group lens unit 900 are inserted into one third-fifth-sixth group guide groove 307. That is, the lens barrel is configured such that the respective cam followers of three lens units can be inserted into one guide groove formed in rectilinear guide frame 300. Accordingly, the number of guide grooves formed in rectilinear guide frame 300 can be reduced, thus realizing the miniaturization of the lens barrel.

Cam frame 500 is fitted on an outer peripheral side of rectilinear guide frame 300. Cam frame 500 is held with its movement in the optical axis direction being restricted with respect to rectilinear guide frame 300, and is rotatable about the optical axis with respect to rectilinear guide frame 300.

As shown in FIG. 2, cam frame 500 is provided with first group cam groove 511 and driven gear 512 on an outer peripheral surface thereof. Driven gear 512 is formed on the image formation side.

Figure 6:
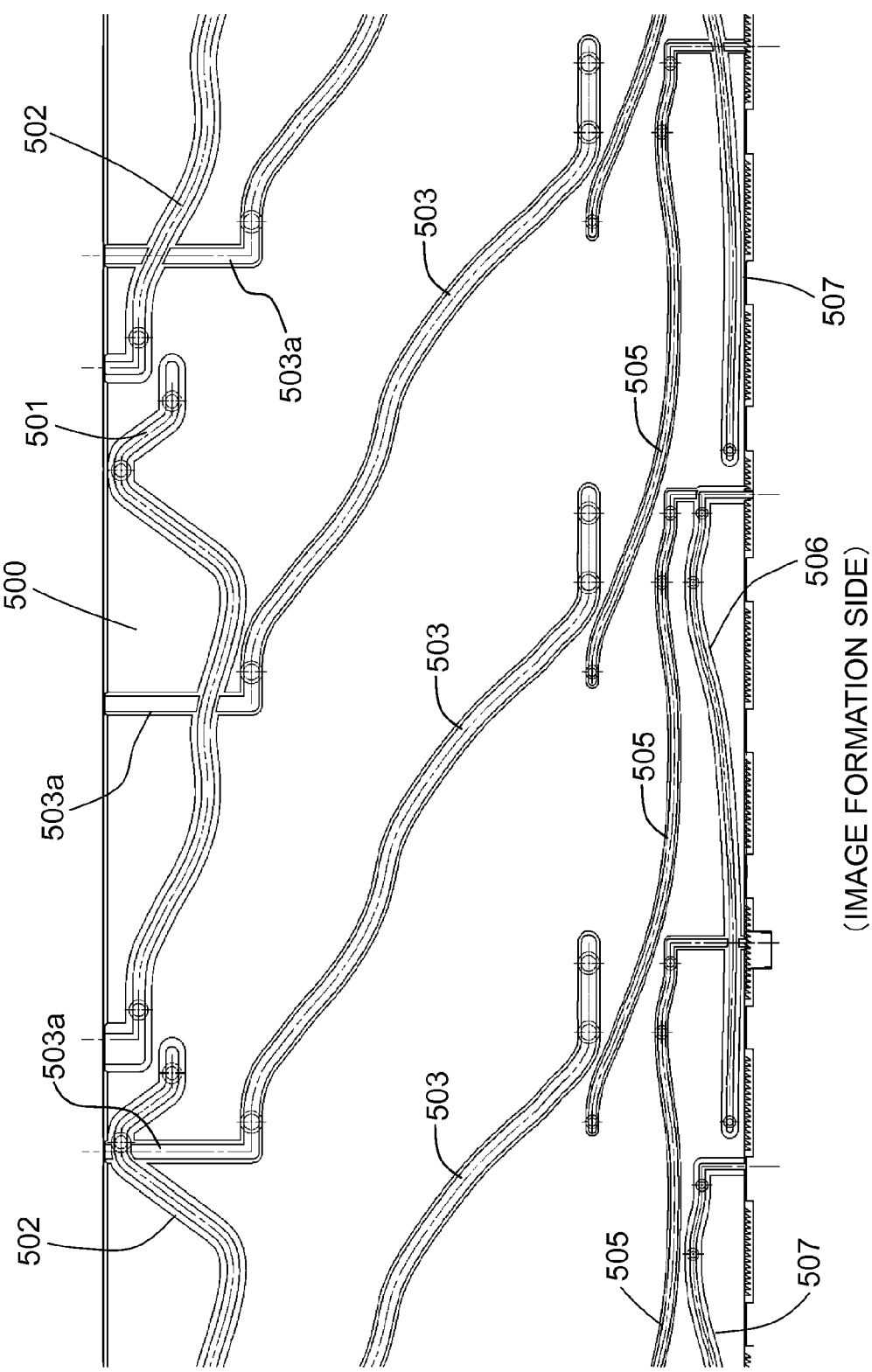
FIG. 6 is an inner-diameter developed view of cam frame 500 according to the first embodiment.

FIG. 6 is an inner diameter developed view of cam frame 500. Cam frame 500 has, on an inner peripheral surface thereof, second group cam grooves 501, 502, three third group cam grooves 503, three fifth group cam grooves 505, and sixth group cam grooves 506, 507 in this order from the subject side.

Third group lens unit 600 shown in FIG. 2 holds a correction lens for correcting image blur and an image blur correction device which drives the correction lens. Third group lens unit 600 holds the correction lens movably in a plane perpendicular to the optical axis. Third group lens unit 600 has an aperture function and a shutter function.

Third group lens unit 600 includes three third group cam followers 621 projecting in the radially outward direction, and moves in the optical axis direction with respect to cam frame 500 due to the rotation of cam frame 500. Two of third group cam followers 621 are inserted into third-fifth group guide grooves 305 of rectilinear guide frame 300 (see FIG. 5), and one remaining third group cam follower 621 is inserted into third-fifth-sixth group guide groove 307 of rectilinear guide frame 300 (see FIG. 5). Three third group cam followers 621 engage with third group cam grooves 503 of cam frame 500 (see FIG. 6). Third group cam followers 621 are guided by third group cam grooves 503 due to the rotation of cam frame 500 so that third group lens unit 600 moves in the optical axis direction.

Fourth group lens unit 700 holds a lens for performing focus adjustment. For performing the focus adjustment, fourth group lens unit 700 is moved in the optical axis direction by focus motor unit 400. Focus motor unit 400 includes a lead screw and a focus motor for rotatably driving the lead screw. Lead screw is directly connected to a motor shaft of the focus motor. Fourth group lens unit 700 includes a rack which engages with the lead screw. Fourth group lens unit 700 is moved in the optical axis direction due to rotational driving of the lead screw.

Fifth group lens unit 800 holds a lens for zooming in. Fifth group lens unit 800 includes three fifth group cam followers 821 projecting in the radially outward direction. Two fifth group cam followers 821 are respectively inserted into two third-fifth group guide grooves 305 of rectilinear guide frame 300 (see FIG. 5), and one remaining fifth group cam follower 821 is inserted into third-fifth-sixth group guide groove 307 (see FIG. 5). Three fifth group cam followers 821 respectively engage with three fifth group cam grooves 505 of cam frame 500 (see FIG. 6). Fifth group cam followers 821 are guided by fifth group cam grooves 505 due to rotation of cam frame 500 so that fifth group lens unit 800 moves in the optical axis direction.

Figure 7:
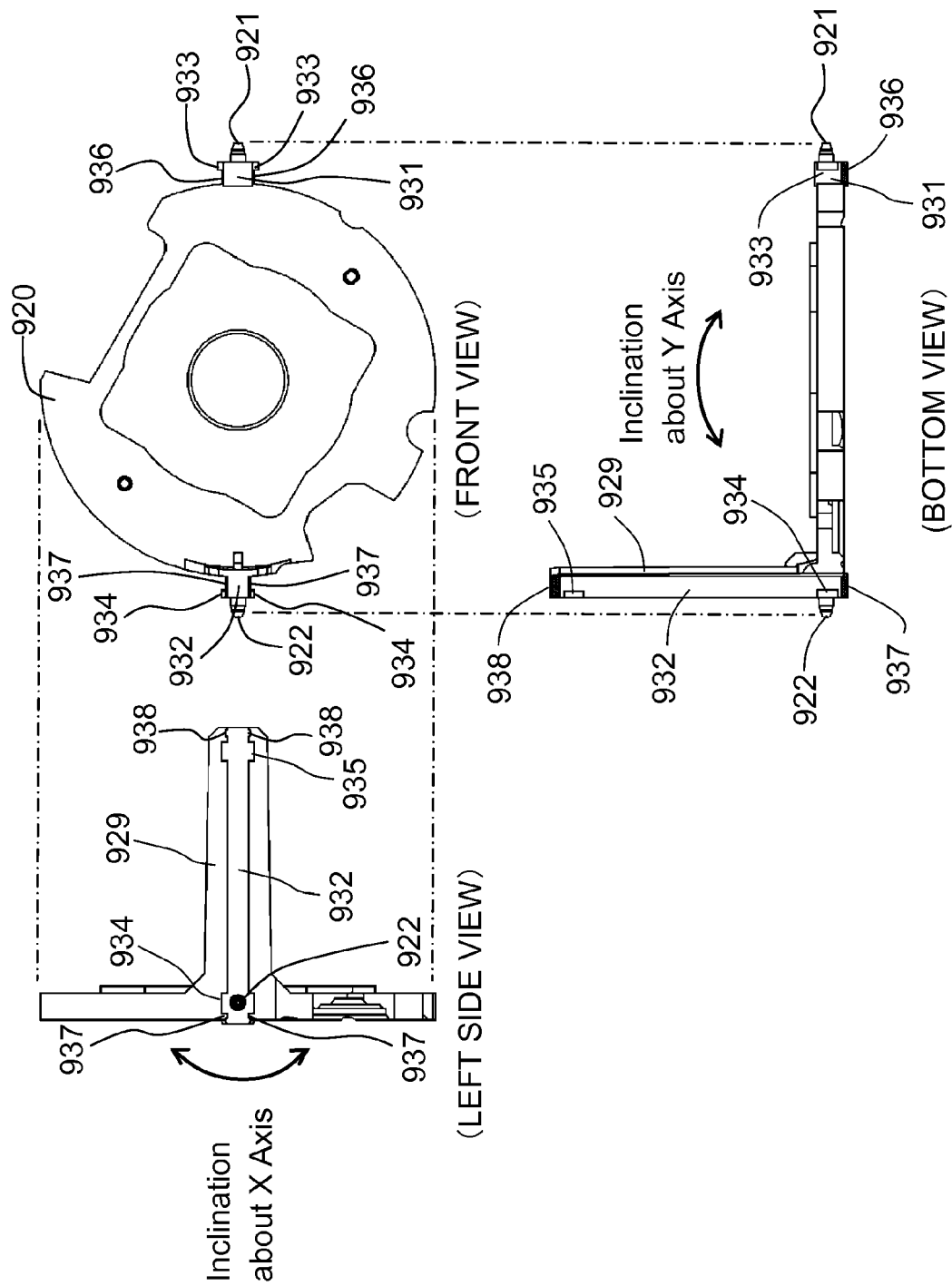
FIG. 7 is an explanatory view showing a shape of sixth group lens unit 900 according to the first embodiment.

FIG. 7 is an explanatory view showing a shape of sixth group lens unit 900. Sixth group lens unit 900 includes a lens for zooming in and sixth group lens frame 920 which holds the lens. Sixth group lens unit 900 includes sixth group cam followers 921, 922 which project in the radially outward direction. Sixth group cam follower 921 is inserted into third-fifth-sixth group guide groove 307 of rectilinear guide frame 300 (see FIG. 5), and sixth group cam follower 922 is inserted into sixth group guide groove 306 of rectilinear guide frame 300 (see FIG. 5). Further, sixth group cam followers 921, 922 respectively engage with two sixth group cam grooves 506, 507 of cam frame 500 (see FIG. 6). Sixth group cam followers 921, 922 are guided by sixth group cam grooves 506, 507 due to the rotation of cam frame 500 so that sixth group lens unit 900 moves in the optical axis direction. Sixth group lens frame 920 is one example of a movable frame.

Master flange 1000 is a member which is mounted on the camera body. Master flange 1000 has a substantially cylindrical shape, and imaging element unit 1200 is mounted on an end surface of master flange 1000 on an image formation side. Master flange 1000 also holds rectilinear guide frame 300 and zoom motor unit 1100 thereon. Zoom motor unit 1100 is mounted on a side surface of master flange 1000.

Zoom motor unit 1100 includes a drive gear and a motor. The drive gear is rotated by rotatably driving the motor. The drive gear is meshed with driven gear 512 of cam frame 500. Cam frame 500 is rotatably driven by rotating the drive gear by the motor.

Imaging element unit 1200 includes an imaging element. The imaging element converts light formed into an image by an optical system configured by a plurality of optical elements into an electric signal.

Flexible printed circuit board 1300 electrically connects actuators such as focus motor unit 400, third group lens unit 600, and zoom motor unit 1100, position detection sensors, and the like with a main body circuit.

As described above, in the lens barrel, when cam frame 500 is rotated by a predetermined angle, first group lens unit 100, second group lens unit 200, third group lens unit 600, fifth group lens unit 800, and sixth group lens unit 900 move to predetermined positions, thus performing zooming. Further, in the lens barrel, fourth group lens unit 700 is moved to a predetermined position by driving of focus motor unit 400, thus performing focus adjustment.

2. Configuration of Cam

Next, a mechanism for moving second group lens unit 200 and sixth group lens unit 900 in the optical axis direction will be described with reference to FIGS. 4 to 9.

Firstly, second group lens frame 220 will be described. As shown in FIG. 4, on the outer periphery of second group lens frame 220, second group cam followers 221, 222 which project in the radially outward direction are formed at positions opposite to each other in the circumferential direction by 180°. Second group cam followers 221, 222 opposite to each other by 180° in the circumferential direction engage with second group cam grooves 501, 502 shown in FIG. 6, whereby the inclination of second group lens frame 220 about the Y axis shown in FIG. 4 is restricted.

Second group lens frame 220 has a substantially cylindrical shape, and extension portion 229 is formed on the second group cam follower 222 side such that a portion of an outer peripheral portion of second group lens frame 220 extends toward the image formation side from the outer peripheral portion. Further, as shown in FIGS. 3 and 4, projections 231, 232 which project in the radially outward direction from the outer peripheral surface are respectively formed at positions where second group cam followers 221, 222 are provided. Projection 231 on the second group cam follower 221 side is formed so as to extend from the subject-side end portion to the image-formation-side end portion of the outer peripheral portion of second group lens frame 220 in the optical axis direction. Projection 232 on the second group cam follower 222 side is formed so as to extend from the subject-side end portion of the outer peripheral portion of second group lens frame 220 to the image-formation-side end portion of extension portion 229 in the optical axis direction.

As shown in FIGS. 3 and 4, on portions of projections 231, 232 in the vicinity of second group cam followers 221, 222, restricting protrusions 233, 234 are formed. Restricting protrusion 235 is formed on the image formation side of projection 232 formed on extension portion 229. Restricting protrusions 233, 234, 235 have a shape in which a portion of an outer-peripheral-side end portion of each of projections 231, 232 extends on both sides in the circumferential direction with a fixed width.

Guide protrusions 236, 237 are respectively formed on projections 231, 232 in the vicinity of second group cam followers 221, 222, and guide protrusion 238 is formed on the image formation side of projection 232 formed on extension portion 229. Guide protrusions 236, 237, 238 are formed into a shape in which a portion of each of projections 231, 232 slightly projects toward both sides in the circumferential direction with a fixed width in the optical axis direction as well as in the radial direction.

In this first embodiment, widths of guide protrusions 236, 237, 238 in the optical axis direction are set smaller than widths of restricting protrusions 233, 234, 235 in the optical axis direction. Heights of guide protrusions 236, 237, 238 which project in the circumferential direction are set smaller than heights of restricting protrusions 233, 234, 235 extending in the circumferential direction.

Guide protrusions 236, 237 are formed on the radially inner peripheral side of restricting protrusions 233, 234 and on the subject side. Guide protrusion 238 is formed on an end portion of projection 232 formed on extension portion 229 on the image formation side.

Guide protrusion 236 of second group lens frame 220 is fitted into second group guide groove 301 of rectilinear guide frame 300 shown in FIG. 5, and guide protrusions 237, 238 are fitted into second group guide grooves 302 of rectilinear guide frame 300. In conformity with the configuration where the guide formed on extension portion 229 of second group lens frame 220 is elongated to the image formation side in the optical axis direction, second group guide groove 302 is formed longer than second group guide groove 301 toward the image formation side in the optical axis direction.

Next, sixth group lens frame 920 will be described. As shown in FIG. 7, on the outer periphery of sixth group lens frame 920, sixth group cam followers 921, 922 which project from the outer peripheral surface in the radial direction are formed at positions opposite to each other in the circumferential direction by 180°. Sixth group cam followers 921, 922 opposite to each other by 180° in the circumferential direction engage with sixth group cam grooves 506, 507 shown in FIG. 6, whereby the inclination of sixth group lens frame 920 about the Y axis shown in FIG. 4 is restricted.

Sixth group lens frame 920 has extension portion 929 formed on the sixth group cam follower 922 side such that a portion of an outer peripheral portion of sixth group lens frame 920 extends toward the subject side from the outer peripheral portion. Further, as shown in FIG. 7, projections 931, 932 which project in the radially outward direction from the outer peripheral surface are respectively formed at positions where sixth group cam followers 921, 922 are provided. Projection 931 on the sixth group cam follower 921 side is formed so as to extend from the subject-side end portion to the image-formation-side end portion of the outer peripheral portion of sixth group lens frame 920 in the optical axis direction. Projection 932 on the sixth group cam follower 922 side is formed so as to extend from the image-formation-side end portion of the outer peripheral portion of sixth group lens frame 920 to the subject-side end portion of extension portion 929 in the optical axis direction.

As shown in FIG. 7, on portions of projections 931, 932 in the vicinity of sixth group cam followers 921, 922, restricting protrusions 933, 934 are formed respectively. Restricting protrusion 935 is formed on the subject side of projection 932 formed on extension portion 929. Restricting protrusions 933, 934, 935 have a shape in which a portion of an outer-peripheral-side end portion of each of projections 931, 932 extends on both sides in the circumferential direction with a fixed width.

Guide protrusions 936, 937 are respectively formed on image-formation-side end portions of projections 931, 932 in the vicinity of sixth group cam followers 921, 922, and guide protrusion 938 is formed on the subject-side end portion of projection 932 formed on extension portion 929. Guide protrusions 936, 937, 938 have a shape in which a portion of each of projections 931, 932 slightly projects toward both sides in the circumferential direction with a fixed width in the optical axis direction as well as in the radial direction.

In the first embodiment, widths of guide protrusions 936, 937, 938 in the optical axis direction are set smaller than widths of restricting protrusions 933, 934, 935 in the optical axis direction. Heights of guide protrusions 936, 937, 938 projecting in the circumferential direction are set smaller than heights of restricting protrusions 933, 934, 935 extending in the circumferential direction.

Guide protrusions 936, 937 are formed closer to the image formation side in the optical axis direction than sixth group cam followers 921, 922 and restricting protrusions 933, 934. Guide protrusion 938 is formed closer to the subject side in the optical axis direction than restricting protrusion 935.

Guide protrusion 936 of sixth group lens frame 920 is fitted into third-fifth-sixth group guide groove 307 of rectilinear guide frame 300 shown in FIG. 5, and guide protrusions 937, 938 are fitted into sixth group guide grooves 306 of rectilinear guide frame 300.

Figure 8:
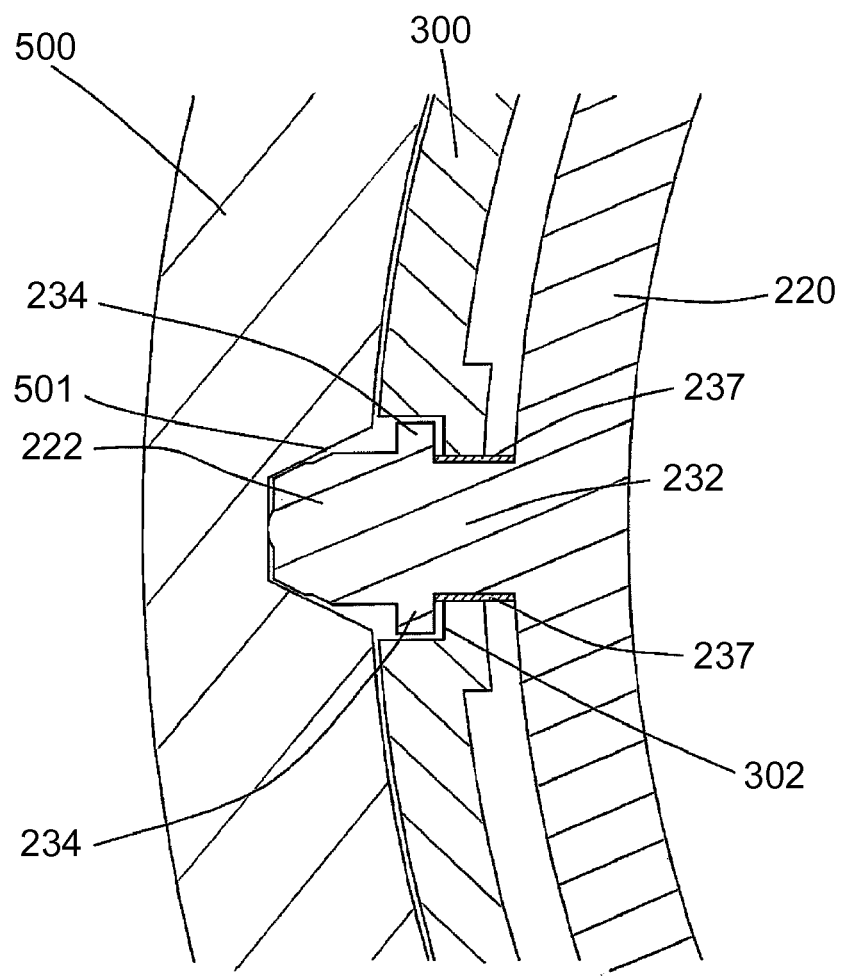
FIG. 8 is an explanatory view showing the relationship among second group lens unit 200, rectilinear guide frame 300, and cam frame 500 according to the first embodiment.

FIG. 8 is an explanatory view showing the relationship among second group lens unit 200, rectilinear guide frame 300, and cam frame 500. FIG. 8 shows the vicinity of second group cam follower 222 of second group lens unit 200 in an enlarged manner. As shown in FIG. 8, a groove width in the circumferential direction of second group guide groove 302 of rectilinear guide frame 300 is set in two stages in the radial direction, wherein the groove width on the inner peripheral side is smaller than the groove width on the outer peripheral side. Guide protrusions 237, 238 of second group lens frame 220 are fitted into portions of second group guide grooves 302 on the inner peripheral side having a small groove width. Restricting protrusions 234, 235 pass through portions of second group guide grooves 302 on the outer peripheral side having a large groove width with a slight gap therebetween in the radial direction as well as in the circumferential direction.

Although FIG. 8 shows the vicinity of second group guide groove 302 into which guide protrusion 237 is fitted, second group guide groove 301, sixth group guide groove 306, and third-fifth-sixth group guide groove 307 have substantially the same structure. That is, guide protrusions 236 are fitted into portions of second group guide groove 301 on the inner peripheral side having a small groove width, and restricting protrusions 233 pass through portions of second group guide groove 301 on the outer peripheral side having a large groove width. Guide protrusions 937, 938 of sixth group lens frame 920 are fitted into portions of sixth group guide grooves 306 on the inner peripheral side having a small groove width, and restricting protrusions 934, 935 of sixth group lens frame 920 pass through portions of sixth group guide groove 306 on the outer peripheral side having a large groove width. Further, guide protrusions 936 of sixth group lens frame 920 are fitted into portions of third-fifth-sixth group guide grooves 307 on the inner peripheral side having a small groove width, and restricting protrusion 933 pass through portions of third-fifth-sixth group guide grooves 307 on the outer peripheral side having a large groove width.

By partially fitting these parts with each other within a narrow range in this manner there is provided an effect that the size adjustment of the respective parts is facilitated and rattling can be reduced. Further, by setting a distance in the optical axis direction between guide protrusions 237 and guide protrusions 238 large, the inclination of second group lens frame 220 about the X axis can be reduced even when the gap between guide protrusions 237 and guide protrusions 238 is held equal. Further, by forming guide protrusions 236 with respect to guide protrusions 237 and guide protrusions 238, the inclination of second group lens frame 220 about the Z axis can be reduced. Guide protrusions 936, 937, 937 of sixth group lens frame 920 third-fifth-sixth group guide groove 307 have substantially the same structure.

As described above, the inclination about the Y axis is restricted by two second group cam followers 221, 222, and the inclination about the X axis is restricted by guide protrusions 237, 238. In this manner, by separately providing the restrictions on inclination in the respective directions, the sizes of the respective parts can be relatively easily adjusted, and at the same time, second group lens frame 220 can be moved with high accuracy with a simple configuration. Further, the inclination of second group lens frame 220 about the Z axis can be restricted by guide protrusions 236. The same applies for sixth group cam followers 921, 922 and guide protrusions 936, 937, 938 of sixth group lens frame 920.

In addition, restricting protrusions 233, 234, 235 prevent second group lens frame 220 from being detached from rectilinear guide frame 300 and cam frame 500 when a large force is applied to the lens barrel such as the case where the lens barrel is dropped. In the same manner, restricting protrusions 933, 934, 935 prevent sixth group lens frame 920 from being detached from rectilinear guide frame 300 and cam frame 500 when a large force is applied to the lens barrel such as the case where the lens barrel is dropped.

Next, the relationship between cam frame 500 and the respective lens units will be described. As shown in FIG. 6, three third group cam grooves 503 are formed on the whole circumference of cam frame 500. In the same manner as third group cam groove 503, three fifth group cam grooves 505 are also formed on the whole circumference of cam frame 500. On the other hand, with respect to second group cam grooves provided for moving second group lens unit 200, two second group cam grooves (second group cam grooves 501, 502) are formed on the whole circumference of cam frame 500. In the same manner, two sixth group cam grooves (sixth group cam grooves 506, 507) for moving sixth group lens unit 900 are formed on the whole circumference of cam frame 500.

The number of second group cam grooves and the number of sixth group cam grooves are set to two as described above because the following drawbacks occur when the number of second group cam grooves and the number of three sixth group cam grooves are set to three.

For example, when three second group cam grooves and three sixth group cam grooves are formed while changing neither the diameter of the cam frame nor the inclination angle of the second group cam grooves, the second group cam grooves intersect with each other. When the second group cam groove intersect with each other, since these cam grooves have the same groove width and the same groove depth, there is a possibility that rattling occurs and the lens frame is detached at the portion where the cam grooves intersect with each other.

On the other hand, for example, when the inclination angle of the second group cam grooves is set steep without changing the diameter of the cam frame to prevent three second group cam grooves from intersecting with each other, a load necessary for rotating the cam frame is increased.

Further, for example, when the diameter of the cam frame is increased without changing the inclination angle of the second group cam grooves to prevent three second group cam grooves from intersecting with each other, the diameter of the lens barrel is increased.

In view of the above drawbacks, in the first embodiment, the number of second group cam grooves of cam frame 500 is set to two (second group cam grooves 501, 502), and the number of cam followers provided to second group lens frame 220 is set to two (second group cam followers 221, 222). With such a configuration, a load imposed on the lens barrel is reduced, thus realizing the configuration advantageous for miniaturizing the lens barrel. Although the description has been made above with respect to second group cam grooves 501, 502, the same applies to sixth group cam grooves 506, 507.

In the case where two second group cam grooves (second group cam grooves 501, 502) for moving the second group lens unit and three third group cam grooves 503 for moving the third group lens unit are formed on cam frame 500, the number of grooves differs between the second group cam grooves and third group cam grooves 503. Hence, insertion portions 503a of third group cam grooves 503 inevitably intersect with second group cam grooves 501, 502.

Figure 9A:
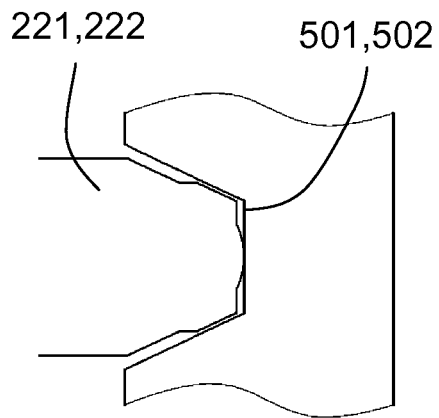
FIGS. 9A to 9D are an explanatory view showing the relationship between cam followers of the respective lens units and the respective cam grooves of cam frame 500 according to the first embodiment.
Figure 9B:
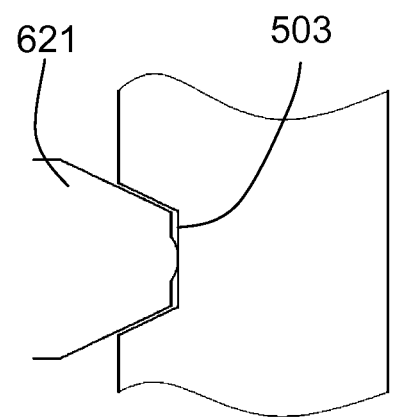

In view of the above, in the first embodiment, as shown in FIGS. 9A and 9B, depths of second group cam grooves 501, 502 are set larger than a depth of third group cam groove 503. Further, distal ends of second group cam followers 221, 222 are formed into a stepped shape so that second group cam followers 221, 222 slide only at portions of second group cam grooves 501, 502 where the groove depth is large. With such a configuration, the occurrence of rattling or catching can be suppressed at portions where second group cam grooves 501, 502 intersect with insertion portion 503a.

Figure 9C:
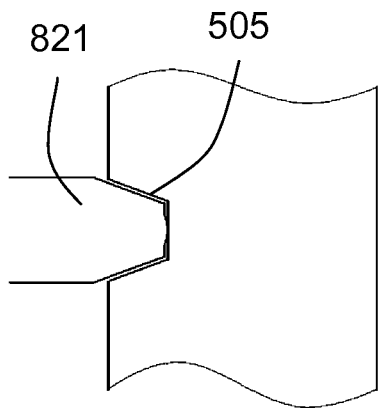
Figure 9D:
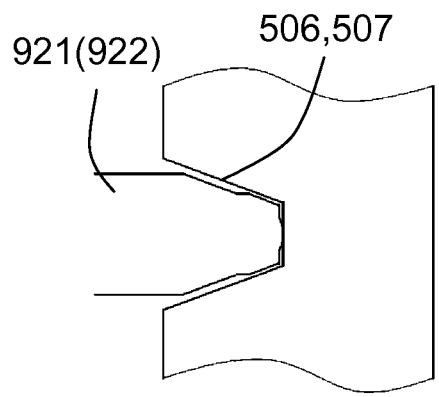

In the same manner, as shown in FIGS. 9C and 9D, depths of sixth group cam grooves 506, 507 are set larger than a depth of fifth group cam groove 505 so that sixth group cam followers 921, 922 slide only at portions of sixth group cam grooves 506, 507 where the groove depth is large. Accordingly, the occurrence of rattling or catching can be suppressed at portions where sixth group cam grooves 506, 507 intersect with the insertion portion of fifth group cam groove 505.

As described above, according to this configuration, it is possible to move the lens unit with a simple configuration and with high accuracy, and further, this configuration is advantageous in reducing a load imposed on the lens barrel as well as in miniaturizing the lens barrel.

3. Conditions for Acquiring Maximum Advantageous Effects

Figure 10B:
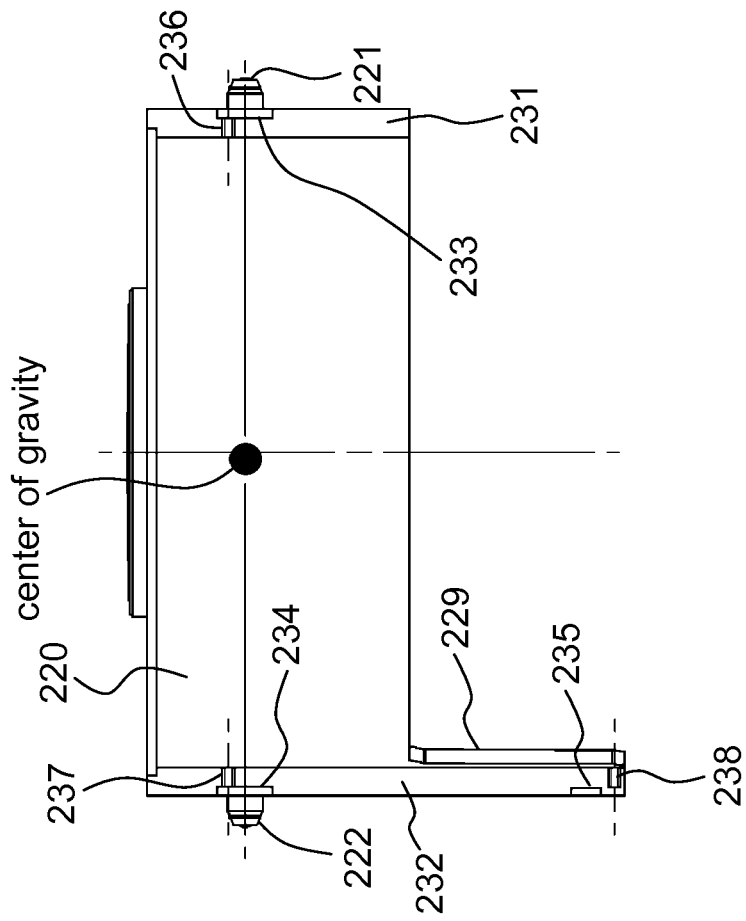
FIGS. 10A and 10B are an explanatory view showing the relationship between second group lens frame 220 and a position of a center of gravity thereof in the first embodiment.
Figure 10A:
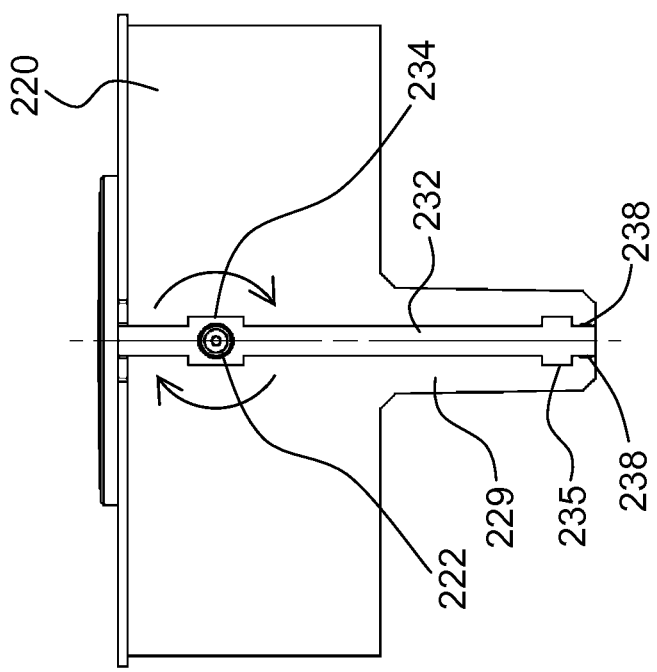

Next, conditions under which the maximum advantageous effects can by acquired by the above configuration of the lens barrel will be described with reference to FIG. 10. FIGS. 10A and 10B are explanatory views showing the relationship between second group lens frame 220 and the position of the center of gravity thereof. FIG. 10A corresponds to the side view shown in FIG. 4, and FIG. 10B corresponds to the bottom view shown in FIG. 4. Arrows shown in FIG. 10A indicate the direction of inclination about the X axis.

Condition 1:

It is preferable that the position in the optical axis direction of a straight line connecting second group cam follower 221 and second group cam follower 222 and a position in the optical axis direction of the center of gravity of second group lens frame 220 substantially agree with each other. That is, the position in the optical axis direction of second group cam follower 221 and the position in the optical axis direction of second group cam follower 222 substantially agree with the position in the optical axis direction of the center of gravity of second group lens frame 220.

Advantageous Effect Obtained Under Condition 1:

The moment force which is applied to second group lens frame 220 due to a change in posture of the lens barrel, an impact which occurs when the lens barrel falls or the like can be suppressed to a low level, so that the deformation or the breakage of extension portion 229 can be suppressed. These advantageous effects particularly contribute to the miniaturization and the narrowing of extension portion 229.

Condition 2:

The position in the optical axis direction of guide protrusions 237 and the position in the optical axis direction of guide protrusions 238 are on both sides of second group lens frame 220 with the center of gravity therebetween. That is, in the optical axis direction, the center of gravity of second group lens frame 220 is positioned between the position of guide protrusion 237 and the position of guide protrusion 238.

Advantageous Effect Obtained Under Condition 2:

When both second group cam followers 221, 222 take the horizontal posture, second group lens frame 220 is supported on rectilinear guide frame 300 by three respective surfaces on one side of guide protrusion 237, guide protrusion 238, and guide protrusion 236. The movement of second group lens frame 220 is retained only within a range of play so that the inclination of second group lens frame 220 can be suppressed.

Condition 3:

The position in the optical axis direction of guide protrusions 237 and the position in the optical axis direction of guide protrusions 238 are arranged on both sides of second group lens frame 220 with second group cam followers 221, 222 therebetween. That is, in the optical axis direction, second group cam followers 221, 222 are positioned between the position of guide protrusions 237 and the position of guide protrusions 238 in the optical axis direction.

Advantageous Effect Obtained Under Condition 3:

At the time of zooming, a pushing force is applied to surfaces on one side of guide protrusions 237, 238 due to a frictional force generated by the cam followers. Hence, the movement of second group lens frame 220 is retained only within a range of play so that the inclination of second group lens frame 220 can be suppressed. Accordingly, it is possible to suppress the difference in inclination of second group lens frame 220 between at the time of zooming in the telephoto direction from a wide angle state and at the time of zooming in the wide angle direction from a telephoto state.

Condition 4:

Guide protrusion 236 in the optical axis direction is positioned close to second group cam follower 221. That is, in the optical axis direction, second group cam follower 221 is positioned in the vicinity of guide protrusions 236.

Advantageous Effect Obtained Under Condition 4:

At the time of zooming, it is possible to reduce a moment force generated due to the difference in position in the optical axis direction between second group cam follower 221 and guide protrusions 236 by a frictional force generated by the cam followers. It is possible to suppress the difference in inclination of second group lens frame 220 between at the time of zooming in the telephoto direction from a wide angle state and at the time of zooming in the wide angle direction from a telephoto state.

Although conditions 1 to 4 are described as conditions with respect to second group lens frame 220, the same conditions are applied to sixth group lens frame 920.

The embodiment has been described above as an example of the technique according to this disclosure. For this purpose, the attached drawings and the detailed description are provided.

Accordingly, the constituent elements described in the accompanying drawings and the detailed description may include not only the constituent elements necessary for overcoming the problems but also constituent elements which are unnecessary for overcoming the problems in order to exemplify the above techniques. Therefore, such unnecessary constituent elements should not be immediately determined to be necessary, for the reason that these unnecessary constituent elements are described in the accompanying drawings and the detailed description.

Further, the above embodiment is merely for exemplifying the techniques according to the present disclosure, and therefore, various changes, replacements, additions, omissions, and the like can be made thereto within the scope of the claims and scopes equivalent thereto.

The lens barrel of this disclosure is applicable to a lens barrel of a digital still camera, an interchangeable lens, or the like.

What is claimed is:

1. A lens barrel comprising:
a movable frame which has two cam followers provided in a circumferential direction about an optical axis and two guide protrusions provided along an optical axis direction;
a cam frame having two cam grooves with which the two cam followers of the movable frame are engaged respectively; and
a guide frame having one guide groove with which the two guide protrusions are engaged.

2. The lens barrel according to claim 1, wherein the movable frame further includes another guide protrusion which is provided at a position facing a position where one of the two guide protrusion is provided in the circumferential direction about the optical axis.

3. The lens barrel according to claim 1, wherein a position of a line connecting the two cam followers in the optical axis direction and a position of a center of gravity of the movable frame in the optical axis direction substantially agree with each other.

4. The lens barrel according to claim 1, wherein the center of gravity of the movable frame in the optical axis direction is positioned between portions where the two guide protrusions are respectively provided.

5. The lens barrel according to claim 1, wherein the two cam followers are positioned between portions where the two guide protrusions are respectively provided in the optical axis direction.

* * * * *